Nov. 3, 1942.  O. C. MARTIN  2,300,584
TUBE COUPLING
Filed June 22, 1940
Fig. 1.
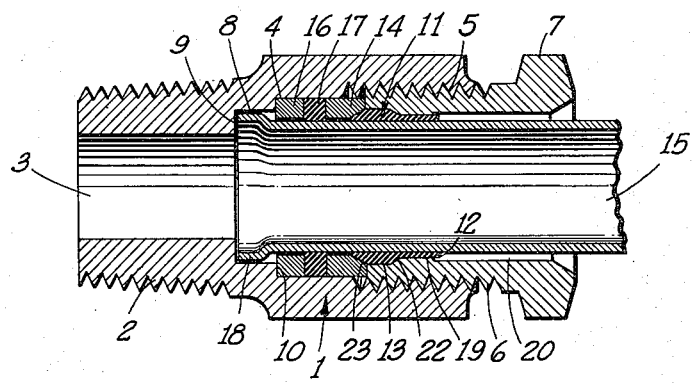
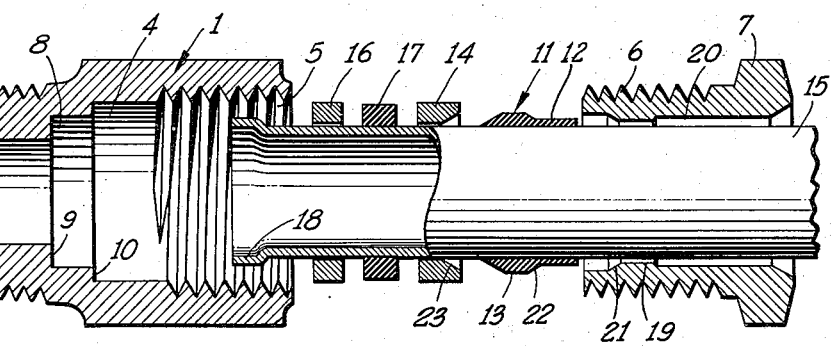
Fig. 2.
OTIS C. MARTIN
INVENTOR
ATTORNEY Patented Nov. 3, 1942

2,300,584

UNITED STATES PATENT OFFICE 2,300,584

TUBE COUPLING

Otis C. Martin, Los Angeles, Calif.

Application June 22, 1940, Serial No. 341,856

4 Claims. (Cl. 285—90)

My invention relates to tube couplings and has particular reference to a coupling or fitting for connecting tubes or parts of a tube or pipe line without requiring the provision of threads upon the ends of the tubes so connected.

In many hydraulic or pneumatic power lines it is desirable to use relatively thin-walled and substantially flexible tubes which may be formed of copper, brass, aluminum or other suitable metal, the wall thicknesses of which do not readily permit the cutting of threads upon the ends of such pipes or tubes for the purpose of connecting such pipes or tubes together or to valves or other fittings and apparatus which must be interposed in the lines.

Heretofore it has been the common practice to employ what is known as a "solderless fitting" for making such connection and interconnection of this type of tubing line and these prior devices have been characterized by the flaring outwardly of the end of the pipe or tube to provide a tapered surface which is forced into metal to metal sealing contact with a tapered seat formed upon the fitting or connector, the sealing metal to metal engagement being maintained by a longitudinal force exerted upon the flared end of the pipe, pressing such flared end tightly against the seat of the fitting. Such fittings, however, which employ metal to metal sealing contact require that upon initially assembling the tube in the fitting the metal of the flared end of the tube must be substantially crushed against the seat of the fitting in order to insure a fluid-tight seal and hence whenever it becomes necessary to disconnect the tube from the fitting it is substantially impossible to reconnect the fitting to the tube with assurance that a fluid-tight seal will be made with the previously crushed and distorted flared end of the tube.

Moreover, such metal to metal seal fittings have the further disadvantage that motion or vibration of the tube or pipe line, which exists in nearly all installations thereof, causes the movement of the tube relative to the fixed and tightly held flared end of the tube, resulting in the rapid crystallization of the end of the tube within the fitting or coupling, and either causing breakage in the line or rendering the metal of the tube so brittle as to cause it to crack or shatter when attempts are made to reconnect the end of the tube with couplings or fittings after a disconnection thereof.

It is therefore an object of my invention to provide a coupling for hydraulic and pneumatic pipe lines of the character described in which the coupling is connected to the tube in such manner that no metal to metal sealing is required.

Another object of my invention is to provide a coupling or fitting of the character set forth in the preceding paragraph in which the fluid seal between the fitting and the tube is accomplished by radial compressive forces exerted between the tube and the fitting.

Another object of my invention is to provide a fitting or coupling of the character described in which the sealing between the tube and the fitting may be accomplished without any metal to metal contact therebetween, thus providing a substantially floating connection which avoids the disadvantages of rapid crystallization occurring in previous couplings.

Another object of my invention is to provide a fitting of the character described in which the tube is not required to be flared with any degree of accuracy but is slightly radially enlarged to provide a positive resistance to outward longitudinal movement of the tube relative to the fitting and thus adapting my fitting to pipe lines carrying extremely high pressures.

Another object of my invention is to provide a fitting of the character described in which the clamping nut employed to produce the sealing compressive forces is at all times under a longitudinal compressive strain so as to substantially prevent any loosening of the nut as a result of vibration in the pipe or tubing line.

Other objects and advantages of my invention will be apparent from a study of the following specifications, read in connection with the accompanying drawing, wherein Fig. 1 is a vertical sectional view taken through a coupling or connector fitting constructed in accordance with my invention and illustrating the pipe or tube in sealed relation therewith; and Fig. 2 is an exploded vertical sectional view similar to Fig. 1 and illustrating the order and manner of assembly of the various parts of the fitting upon the tubing.

In Fig. 1 I have illustrated a fitting male member or body 1 which, as will be understood by those skilled in this art, may be provided with a male threaded end 2 adapted to be screwed into female threaded sockets on valves or other equipment to which the pipe line is to be connected or the body 1 may be formed as an integral part of such valves or other devices. The body 1 is provided with a longitudinal fluid passage bore 3 therethrough, the bore being enlarged at the rearward end of the body, as indicated at 4, and is provided with suitable internal threads 5 for the reception of external threads 6 formed upon a clamp nut 7. The bore 3 at its junction with the enlargement 4 is preferably provided with a somewhat smaller enlargement 8 to provide a pair of longitudinally spaced shoulders 9 and 10 lying well within the fitting or coupling body 1.

Between the clamp nut 7 and the shoulder 10 of the bore 3 I provide a plurality of sealing and cushioning or damping devices to provide the fluid-tight seal between the tubing and the fitting. As illustrated in Figs. 1 and 2, these sealing cushioning or damping devices comprise a cushion or damping ring 11 which is preferably formed as a sleeve of elastic material, neoprene or another of the oil-resistant synthetic rubbers being preferred to ordinary rubber particularly where the fitting and pipe line are to be used for the transmission of oil or oil bearing pneumatic power fluid. The sleeve 11 is preferably formed with a relatively narrow-walled section 12 adjacent its outer end and with a thickened wall section 13 adjacent its inner end, the purpose of which will be hereinafter described.

Immediately adjacent the cushioning sleeve 11 I dispose a metal ring 14 which is preferably provided with an external diameter substantially conforming with the internal diameter of the enlargement 4 of the bore while the internal diameter of the ring 14 is preferably slightly larger than the external diameter of the pipe or tube 15 with which the fitting is to be associated. I provide a second metal ring 16 which, like the ring 14, fits reasonably well within the enlargement 4 of the bore but has an internal diameter sufficient to be loose upon the pipe or tube 15.

Interposed between the metal rings 14 and 16 is the sealing ring 17 which, like the cushion ring 11, is preferably formed of oil-resistant compressive material such as neoprene or other suitable synthetic rubber, such ring 17 being formed with an external diameter slightly less than the enlargement 4 of the bore 3 and with an internal diameter slightly less than the pipe or tube 15 so that whenever the ring 17 is upon the pipe it is slightly under tension.

In using my fitting as hereinbefore described, the pipe 15 is cut to the desired length and the parts of my fitting are assembled upon the end thereof in the following order: First, the clamping nut 7 is slipped upon the end of the pipe, followed by the cushioning or damping ring 11, the metal ring 14, the sealing ring 17 and finally the metal ring 16. Then the end of the pipe 15 is distorted or radially enlarged as indicated at 18, the shape of the distortion being preferably that illustrated in the drawing comprising a substantial enlargement of the tube circumference but leaving the extreme end cylindrical, the length of the enlargement longitudinally of the pipe being relatively short, and which may be readily accomplished without the employment of accurate dies or any special flaring tools as are required for the flaring of the metal to metal seal type of fittings now in use. The only requisite of the enlargement 18 is that it provide some radial projection extending radially beyond the normal external circumference of the pipe 15.

With the parts assembled upon the pipe 15 as described, the end of the pipe 15 may then be inserted into the enlarged portion 4 of the bore and the clamp nut 6 slid along the pipe to engage the threads 5 and 6. Screwing down the clamping nut will cause the cushion ring 11 to be slid along the pipe into compressive relation against the metal ring 14, which in turn will exert a compressive force against the sealing ring 17 and this will in turn cause the ring 16 to be slid along the pipe until the ring 16 seats solidly against the shoulder 10 of the enlarged portion of the bore. Further tightening of the clamp nut 7 will positively press the metal ring 14 toward the metal ring 16, pressing between them the sealing ring 17 and distorting the shape of the ring to the position indicated in Fig. 1, such compression resulting in radial inwardly and outwardly compressive forces being exerted respectively against the pipe 15 and the interior of the enlargement 4 of the bore and will provide a fluid-tight seal therebetween.

At this point it should be noted that the seal is accomplished strictly by contact between the compressible material 17 against the tube 15 on the one hand and against material of the fitting body 1 on the other hand, there being no metal to metal contact required. In fact, metal to metal contact should be avoided since by making the sealing contact only through the compressive material any vibration of the pipe 15 relative to the fitting 1 will be absorbed by the compressive material and will effectively prevent rapid crytallization of the metal of the pipe 15. To this end I prefer to form the radial distortion 18 of the pipe in such manner that the expanded diameter of the pipe 15 is never equal to the diameter of the enlargement 4 of the bore 3 and also that the longitudinal length of the pipe 15 occupied by the distortion 18 should not be quite equal to the spacing of the shoulders 9 and 10 along the bore 3. Thus the tube 15 in effect "floats" freely within the fitting 1 with the elimination of the disadvantages attendant upon metal to metal contacts.

As the clamping nut 7 was screwed to compress the sealing ring 17, a radially inwardly projecting shoulder 19 on the clamping nut 7 engaged the enlarged or thick-walled portion 13 of the cushion or damping sleeve 11 and thus transmitted the longitudinal forces from the clamping nut to and through the rings 14, 16 and 17. However, it will be noted that the longitudinal bore 20 through the clamping nut 7 is considerably greater in diameter than the external diameter of the pipe or tube 15 so that considerable lateral motion between them is provided. The inwardly projecting shoulder 19 likewise does not quite contact the exterior of the pipe 15 but provides a narrow annular space therebetween into which the thin-walled section 12 of the cushion ring 11 may project.

Thus as the clamping operation takes place, the beveled inner surface 21 of the radial projection 19 on the clamping nut engages the beveled surface 22 on the enlarged portion of the cushion ring 11 and applies both longitudinal and radial compressive forces upon the cushion ring 11 and thus provides an auxiliary compressive radial seal between the body and the tube. The shallow thin-walled sleeve section 12 extends in uncompressed condition as a full resilient cushion or shock absorber between the tube 15 and the nut 7.

It will be noted, however, that the inner end of the cushion ring 11 is under considerable longitudinal compression as a result of its being pressed between the beveled face 21 on the nut 7 and a beveled or tapered face 23 on the metal ring 14. Thus this longitudinal compressive force added to the longitudinal compression forces exerted by the compressed sealing ring 17 tend to cause the threads 6 of the nut 7 and the threads 5 of the body 1 to grip each other and it is found that vibration in the pipe line extending over long periods of time will not tend to loosen the nut 7. Thus positive rotation of the nut by tools will be required in order to release the compressive forces sealing the tube 15 into the fitting.

It will also be noted that the shoulder 19 formed in the bore of the nut 7 is spaced inwardly from the end of the nut which is adapted to engage and exert longitudinal compressive forces upon and between the non-compressible rings 14 and 16. The purpose of this recessing of the shoulder 19 is to permit the inner end of the nut 7 to extend completely over the enlarged portion 13 of the cushion sleeve 11 and into direct metallic contact with the ring 14 when the nut is tightened. It will be observed therefore that by this arrangement tightening of the nut 7 may be employed to exert substantially unlimited compressive force upon the sealing ring 17 while the total force which can be exerted upon the cushion or damping sleeve 11 is limited to that which will be required to permit the end of the nut 7 to make metallic contact with the metal ring 14. Thus while the cushion ring 11 assists in the sealing of the tube to the fitting, it can never be put into such compression as to destroy its usefulness as a shock absorbing or damping cushion interposed between the tube and the nut.

It will be observed therefore that I have provided a fitting or coupling which is particularly adaptable to pipe lines formed of relatively thin-walled tubing and especially such lines as may be required to carry extremely high pressure since, though I depend upon the radially disposed compressive forces exerted between the tubing 15 and the fitting for the entire sealing effect, longitudinal movement of the tube 15 out of the fitting under high transmission pressures is effectively prevented by the enlargement or distortion of the end of the tube 15 to provide the radially projecting portions thereon.

While for simplicity I have illustrated my fitting as a simple connector to be used between the end of a tube and a valve or other device to which the tube is to be connected, it will be apparent that without modifications of the principles of my invention they may be employed to intercouple two adjacent ends of tubings 15 or the body portion of the fitting may be formed directly in valves, motors or other pieces of equipment to which the tubing line is to be coupled.

While I have shown and described the preferred embodiment of my invention, I do not desire to be limited to any of the details of construction shown or described herein, except as defined in the appended claims.

I claim:

1. A tube coupling comprising a body member, a bore therein for receiving a tube end, sealing means interposed between the exterior wall of the tube and the interior wall of the bore including a pair of rings of non-compressible material and a ring of compressible material interposed therebetween, all of said rings being disposed upon said tube for sliding movement therealong, a clamping nut threaded on said body member for exerting a longitudinal compressive force between said non-compressible rings to squeeze the compressible ring radially into sealing relation with said bore and said tube, said nut having a bore through which said tube projects having a diameter sufficiently in excess of the diameter of said tube to provide an annular space therebetween, and a cushion sleeve in said annular space surrounding said tube and interposed directly between said nut and said non-compressible rings whereby tightening of said nut to seal said compressible ring will compact a portion of said cushion sleeve in said annular space between said nut and said tube.

2. A tube coupling comprising a body member, a bore therein for receiving a tube end, sealing means interposed between the exterior wall of the tube and the interior wall of the bore including a pair of rings of non-compressible material and a ring of compressible material interposed therebetween, all of said rings being disposed upon said tube for sliding movement therealong, a clamping nut threaded on said body member for exerting a longitudinal compressive force between said non-compressible rings to squeeze the compressible ring radially into sealing relation with said bore and said tube, said nut having a bore through which said tube projects having a diameter sufficiently in excess of the diameter of said tube to provide an annular space therebetween, and a cushion sleeve of compressible material disposed on said tube between said nut and the adjacent non-compressible ring, said cushion sleeve including a portion of greater thickness than the annular space between said tube and said nut whereby tightening of said nut to compress said compressible ring will also radially compress said cushion ring as an auxiliary seal between said nut and said tube.

3. A tube coupling comprising a body member, a bore therein for receiving a tube end, sealing means interposed between the exterior wall of the tube and the interior wall of the bore including a pair of rings of non-compressible material and a ring of compressible material interposed therebetween, all of said rings being disposed upon said tube for sliding movement therealong, a clamping nut threaded on said body member for exerting a longitudinal compressive force between said non-compressible rings to squeeze the compressible ring radially into sealing relation with said bore and said tube, said nut having a bore through which said tube projects having a diameter sufficiently in excess of the diameter of said tube to provide an annular space therebetween, and a cushion sleeve of compressible material interposed between said nut and the adjacent non-compressible ring, said nut having an inwardly radially projecting shoulder spaced from the end of the bore of said nut to engage and compress said cushion sleeve while permitting direct mechanical contact between the end of said nut and the adjacent non-compressible ring whereby unlimited compressive force may be exerted upon the compressible ring and a limited compressive force may be exerted upon the cushion sleeve.

4. A tube coupling comprising a body member, a bore therein for receiving a tube end, sealing means interposed between the exterior wall of the tube and the interior wall of the bore comprising a ring of resilient material surrounding said tube and deformable radially into sealing relation between said tube and the walls of said bore by compression forces exerted axially on said material, a clamping member surrounding said tube and engaged with said body member for exerting an axial compressive force on said resilient material, and a cushion sleeve formed of resilient material surrounding said tube and interposed between said tube and said clamping member to yieldably hold said tube spaced from said clamping member and permit small amounts of relative movement therebetween.

OTIS C. MARTIN.